Jan. 18, 1944.          J. A. HEANY          2,339,264
ALUMINOUS CERAMICS AND METHOD OF MAKING THE SAME
Filed Oct. 27, 1938
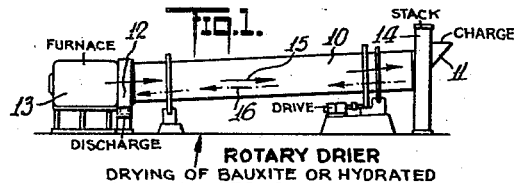
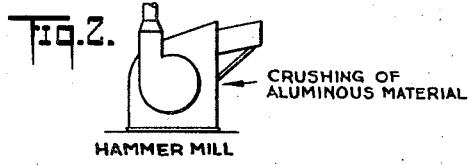
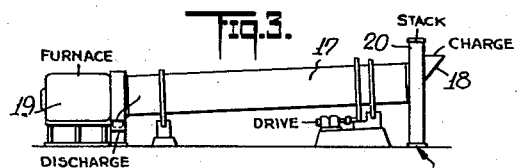
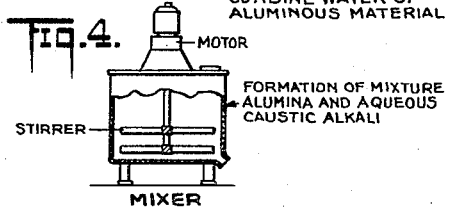
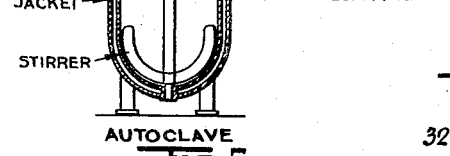
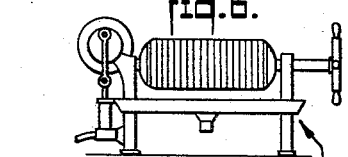
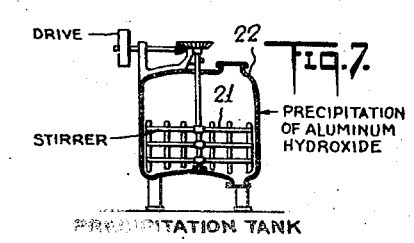
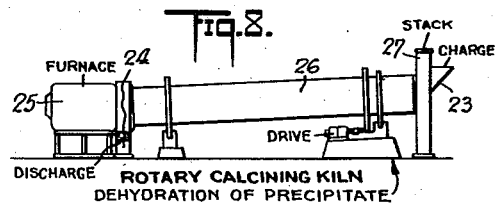
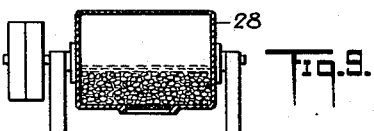
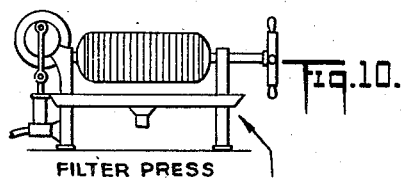
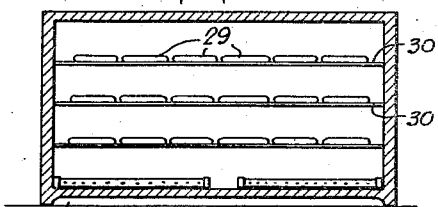
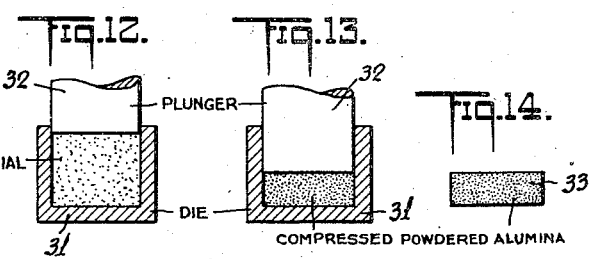
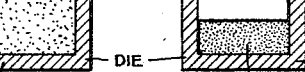
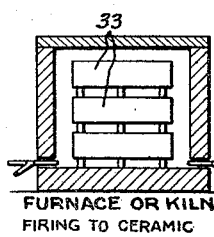
INVENTOR
John Allen Heany
BY
Braselton Whitcomb & Davis
ATTORNEYS Patented Jan. 18, 1944

2,339,264

UNITED STATES PATENT OFFICE 2,339,264

ALUMINOUS CERAMIC AND METHOD OF MAKING THE SAME

John Allen Heany, New Haven, Conn., assignor to Heany Industrial Ceramic Corporation, Rochester, N. Y., a corporation of New York Application October 27, 1938, Serial No. 237,210

7 Claims. (Cl. 106—65)

The present invention relates to aluminous ceramics, and it particularly relates to methods of making the same from either crude or purified aluminous materials.

Although it is possible to apply the processes of the present invention to purified dehydrated aluminous materials such as various forms of alumina ($Al_2O_3$), the present invention has its preferred application to the treatment and processing of bauxite, and to a lesser degree, to the treatment and processing of other hydrated aluminous minerals such as diaspore and gibbsite.

The bauxite as generally found in natural condition or as mined has a formula of $Al_2O_3.2H_2O$ and it contains substantial quantities of iron oxide ranging from ¼ to 5%, silica ranging from 3% to 5%, and titanium oxide ranging from 1½ to 5%.

Typical bauxite compositions are:

Alabama bauxite

|  | Per cent |
|---|---|
| $Al_2O_3$ | 57 |
| $Fe_2O_3$ | ½ |
| $SiO_2$ | 11 to 12 |
| $TiO_2$ | 2½ to 3 |
| Ignition loss | 29 to 30 |

Arkansas bauxite

|  | Per cent |
|---|---|
| $Al_2O_3$ | 58 |
| $Fe_2O_3$ | 4 |
| $SiO_2$ | 5 to 6 |
| $TiO_2$ | 3 to 3½ |
| Ignition loss | 30 |

Aluminous materials have been found to be a most satisfactory base for, or component of, ceramic articles. Considerable difficulty has been encountered in ceramic processing of crude aluminous materials such as bauxite. The impurities in the bauxite and in other crude aluminous materials appear to prevent most satisfactory transformation thereof into dense, hard and high quality ceramics of the type desired for commercial purpose.

Frequently the bauxite when processed to produce a ceramic will result in a material which is soft or of low specific gravity or of an undesirable crystalline structure. Moreover, the materials will usually not be vitreous nor homogeneous and often will be highly porous. Furthermore, the processing often requires that the aluminous material be subjected to treatments in electric furnaces or be fused, with substantially added cost and with the production of only limited quantities per unit time interval.

It is among the objects of the present invention to provide hard, amorphous, dense, homogeneous, vitric-like, non-porous ceramic articles from readily available aluminous materials, such as bauxite, without the necessity of resorting to expensive fusion or electric furnace processing.

Other objects will become apparent on consideration of the following specification.

According to the present invention it has been found possible to produce hard, vitreous, or vitric-like, homogeneous, non-porous, and amorphous aluminous ceramic articles by purifying mineral hydrated alumina such as bauxite and, less preferably, diaspore and gibbsite, followed by grinding to a colloidal size with mechanical hydration of part or of all the purified alumina. After this colloidizing treatment which may take place in a pebble or ball mill, the aluminous materials are formed and then fired in ceramic furnaces at a temperature below 1600° C.

In the purification treatment the hydrated aluminous material, whether bauxite, diaspore or gibbsite, is dried, crushed and then calcined to remove the chemically combined water. Then the calcined material is mixed with aqueous caustic soda or potash, heated, and filtered to remove undissolved suspended particles. After this filtration the aluminum hydroxide may be precipitated and then calcined to produce the alumina which is subjected to the colloidizing process.

After the colloidizing the aluminous material is filter pressed, and the filter cakes are dried and fired directly, or they may be broken up and powdered or pulverized.

The powdered or pulverized material, with or without the addition of water or organic solvents and with or without the addition of catalytic or fluxing materials, such as fire clays, lime, magnesia, water glass, plaster of Paris, feldspar, ball clays, kaolins, silica, enamels and alkaline metal or alkali earth metal hydroxides, chlorides, carbonates, sulphates, borates or phosphates, may be pressed or molded or pugged or extruded or slipped to form an article suitable for firing in a furnace having a temperature ranging from 1200° C. to 1500° C.

The various catalytic and fluxing materials mentioned above may also be added in the pebble mill, and if desired, the aluminous material may be subjected to several pebble mill grindings, in the course of one or more of which a catalytic agent or a fluxing material may be added.

In all cases, however, the amount of catalytic or fluxing materials should be kept less than 20%, and preferably it should be less than 10%, the preferred proportions of catalysts or fluxes ranging from ½% to 5%.

In the preferred procedure, however, it is found that the best ceramics are produced by the omission of vitrifying catalysts and by the omission of fluxes.

It is also possible, if desired, to fire the material several times, grinding up the previously fired material to form the new article to be subjected to firing during the second treatment. Between the first and second, or some subsequent firing, thereby may be a pebble mill or ball mill grinding of the product, and if desired, fluxes or vitrifying catalysts of the nature above mentioned may also be admitted.

To give a detailed description of one method of carrying out the processes of the present invention reference is had to the accompanying drawing which diagrammatically shows in successive figures the various steps to which the material is subjected in its processes to form the final ceramic article.

The raw bauxite, or less preferably, the diaspore ($Al_2O_3.H_2O$) or the gibbsite ($Al_2O_3.3H_2O$) is crushed so that the largest pieces are about one inch in diameter. The crushed material is then passed through the cylindrical drying apparatus shown in Fig. 1, which has a rotary tube 10, an inlet or charging port 11, an outlet or discharging port 12, a furnace 13 and a stack 14. The hot gas is passed as indicated by the solid arrows 15, while the bauxite passes as indicated by the dot and dash arrows 16. The cylinders 10 may be about 40 to 120 feet in length and about 3 to 8 feet in diameter, and they are preferably operated at a temperature of 200° F. to 250° F. as a result of the flame produced in the furnace 13 from coal, oil or some other suitable fuel.

After the bauxite is passed through the drying apparatus or kiln of Fig. 1 it will be deprived of its free moisture ranging from 6% to 20%. The dried aluminous material may then be readily reduced in size to about 50 to 150 mesh, or more preferably to between 80 to 100 mesh, to place the aluminous material or bauxite in such condition that it may be more readily dehydrated or deprived of its chemically combined water. A hammer mill is shown for this purpose in Fig. 2.

In Fig. 3 is shown a cylindrical calciner which is similar in construction to the drier of Fig. 1, but which is lined with refractory fire brick since a much higher temperature of the order of 1700° F. to 1800° F. is utilized.

The dried bauxite or aluminous material is continuously fed into the rotating cylinder 17 from the charge end or inlet 18 and after it has passed slowly through the tube 17, it will emerge at the discharge port as alumina ($Al_2O_3$) in dehydrated condition. The heating in the tube 17 results from a flame projected into the tube from the furnace 19. The hot gases, which pass through the tube 17, are released at the stack 20. If desired, temperatures may be utilized in the tube 17 ranging from 1000° C. to 1500° C.

A satisfactory calcining kiln is one of the Ruggles-Cole type, although other types may be employed.

The hydrated alumina from the kiln of Fig. 3 is then transferred to the mixing machine of Fig. 4 where it is thoroughly mixed and agitated to form a suspension with a water solution of sodium or potassium hydroxide. The preferred solution should have a specific gravity of 1.35 to 1.6, and with caustic soda most satisfactory results have been obtained by using a specific gravity of about 1.45. The agitation may take place for one-quarter hour to several hours, if desired, and it results in a thorough dispersion of the alumina in the alkali solution.

In the autoclave of Fig. 5, which is of steel, the suspension of alumina in aqueous caustic soda is heated to a temperature of about 160° C. to 170° C. for one and one-half to two hours with continuous agitation. This will result in the formation of sodium aluminate of the formula $NaAlO_2$. It is preferred to form this aluminate instead of the one having the formula $Na_3AlO_3$, which latter requires the use of much more caustic alkali.

As indicated in Fig. 6, the aluminate solution is then filtered through a filter press to remove the suspended impurities such as silica, iron oxide, titanium oxide, etc. The solution, after filtration, may then be diluted to a specific gravity of about 1.2 whereupon the aluminum hydroxide is precipitated by bubbling carbon dioxide through the tank as shown in Fig. 7 while the agitator 21 is being operated.

The sodium aluminate solution may instead or also be heated first, stirred and then cooled, and after 30 hours, or in some cases after 50 to 60 hours, the aluminate will have been decomposed to form precipitated aluminum hydroxide. This precipitated aluminum hydroxide is removed from the bottom of the tank 22 of Fig. 7 and then is filter pressed in a press such as indicated in Fig. 6 to yield blocks or cakes of aluminum hydroxide.

These blocks or cakes, with or without drying and pulverization, are introduced into the calcining kiln of Fig. 8 which may be of the same construction as that described in connection with Fig. 3. The kiln as shown in Fig. 8 is preferably 5 to 8 feet in dameter and 18 to 50 feet in length, and a temperature of about 1100° C. is employed. Aluminous material is introduced at 23 and is removed in calcined condition at 24, and the hot gases or flames are produced at the furnace 25 and pass through the rotating tube 26 to the stack 27.

The dehydrated, precipitated, purified aluminum hydroxide is then placed in the rotating vessel casing 28 of the pebble mill of Fig. 9, which may also be a ball mill, with or without the addition of 1% to 10% of a vitrifying catalyst or flux of the type above mentioned. Although many different types of pebble mills may be employed, one type which has been found to be satisfactory is a one gallon mill half filled with pebbles and water, with the water and material to be ground just covering the pebbles. In one embodiment which was found to be satisfactory the weight of the pebbles was six pounds eight ounces, the size of the pebbles varied from one-half to one and one-half inches, and the number of pebbles ranged from 90 to 110.

Although it is possible to use lower temperatures than atmospheric, or to use higher temperatures by the introduction of steam or the provision of a mere jacket, atmospheric temperature was found to be most satisfactory for the grinding, which is preferably continued for more than 30 to 40 hours, and more desirably for 50 to 60 hours. Although the pH of the grinding solution might be adjusted from 6 to 8, it was found most satisfactory to maintain the grinding liquid as near to neutrality as possible.

In certain cases it was found satisfactory to add dispersing agents, such as soap, waste sulphite liquor, starch or dextrin and various gums, resins or fatty acid or alcohol esters, but the addition of these materials should never be in excess of more than about 1% to 10%.

The grinding operation should always be continued until at least from 10% to 50% of the alumina ($Al_2O_3$) has been converted into a chemically hydrated material which tends to form a permanent suspension in water even without a dispersing agent. The preferred material which is produced appears to contain from one-half to three mols of water for each mol of alumina.

The colloidal aluminum hydroxide which is produced by the grinding operation is much finer than 12 microns in size, while the unhydrated material may appear from 12 to 20 microns in size. Preferably the aluminum materials should take up between 10% to 25% of water as the result of the grinding operation, with an optimum of 15%.

When the preferred mixture which is formed in the pebble mill is examined, it is found that it is a mixture of a finely divided, suspended, but non-hydrated material combined with an almost impalpable dispersion of a hydrated material which, although it is very similar to precipitated aluminum hydroxide, is much more readily adapted for ceramic firing. In fact, articles formed and fired from this mechanically hydrated alumina may be produced with a shrinkage of much less than 25% to 30%, which is not possible with precipitated aluminum hydroxide.

The finely divided dispersion from the pebble mill of Fig. 9 is then passed through the filter press of Fig. 10 to form filter blocks or cakes 29, which may be placed upon the shelf 30 of the drier of Fig. 11. These filter cakes 30, after drying, may be directly fired as such or they may be broken up and ground with or without the addition of fluxes or vitrifying catalysts as mentioned above, in amounts varying from 1% to 5%.

The powdered filter cakes 30, without any additions, may be placed in the cylinder 31 of Fig. 12, and pressed by the plunger 32, as indicated in Fig. 13, to about one-half or one-quarter of the volume as loose material. The cake, which is indicated in Fig. 14 as 33, may then be fired in the furnace or kiln shown in Fig. 15. This kiln may be either of the periodic or tunnel type, and a temperature of 1400° C. to 1500° C. may be utilized for from 5 to 60 hours. The atmosphere in the kiln may be atmospheric or it may contain reducing gases such as carbon monoxide, or even hydrogen or neutral gases such as nitrogen. Where oxidizing is desired, oxidizing materials or salts may be mixed with the aluminous material in the pebble mill or after grinding of the filter cakes 30.

The broken up filter cakes, or even the pressed material, as indicated in 33, may also be ground with water and without the addition of a flux or vitrifying catalysts to form a slip which may then be slip cast, or the material may contain sufficient moisture either because of the limited drying of the filter cakes or because of addition of water following grinding, to be pugged or extruded to form rods or tubes as may be desirable.

The resultant fired aluminous material is vitreous, amorphous, non-porous, dense and has a conchoidal fracture. The material may be formed into many types of articles including electrical insulation of low power factor (0.14) for high frequency work, refractory articles such as bricks, furnace linings, crucibles, muffles, etc.; abrasives such as abrasive grains to make abrasive wheels, stones, abrasive paper and cloths; hard, dense articles such as sand-blast nozzles, balls and pebbles for grinding mills and bricks for lining same, textile guides for the textile and artificial silk industries, dies for wire drawing, jewel bearings for watches, clocks, instruments, bearings for engines, machinery, etc.; laboratory articles such as beakers, combustion tubes, casseroles, funnels, mortars, etc.; tubes, and other shapes and forms for the chemical and many other industries.

The material may be produced in suitable colored forms by the addition of small amounts of inert pigments thereto, either in the pebble mill of Fig. 9 or following the drying of the filter cakes, as indicated in Fig. 11.

The preferred material has a shrinkage not to exceed 30% and it should have a specific gravity of about 3.25 to 4 and a hardness of 65 to 75 on the capital C scale of the Rockwell hardness machine, for example; a specific gravity of 3.53 and a Rockwell hardness of 74. The most desirable materials are those in which the fine particles following the grinding do not exceed 50 microns, and preferably are for the most part within the range of 5 to 20 microns. In the most satisfactory compositions the shrinkage upon firing is about or less than 24%.

In the grinding operation, as described in connection with Fig. 9, it is desirable that the colloidized material should not take up any outside impurities as may be derived from the walls of the grinding mills, or from the balls or crushing rods. To this end the crushing and grinding mills are preferably lined with flint and provided with flint pebbles, permitting the production of a smooth, white product having the consistency of cream and devoid of any sandy particles or chips. If desired, the material may be filtered or strained between the steps of Figs. 9 and 10 to remove any possible particles or chips which may have been taken up. The material is then filter pressed. (Fig. 10.)

The filter cakes produced following the operation of Fig. 10 may contain from 12% to 18% of water and they may be readily sub-divided after drying by moistening them, in which case they will crack up to relatively small particles. This may be accomplished by placing them upon a wet absorbent material. It is also possible to divide the material by dropping the fired material while it is still very hot into water preparatory to grinding for a second firing operation.

In pressing the material as indicated in Figs. 12 and 13, a lubricant may also be utilized. Where the wet material is pugged directly from the wet filter cakes it may be treated in a pug mill of the type manufactured by the Ceramic Machine Company, or of the type known as the F-R-H vacuum pottery pug mill, manufactured by the Fate-Root-Heath Company of Plymouth, Ohio. In these pug mills pressure and vacuum may be applied to draw out the air from the mass so that the extruded substance is substantially devoid of air and gas bubbles. This will result in a denser and more homogeneous aluminous ceramic.

The pug mill is preferably provided with knives to first cut up the crushed filter cake, following which the material is picked up by an auger or Archimedes screw which presses out the material through dies to form sheets or cylinders. The mass extruded from the pug mill preferably has the consistency of a thick dough and is termed a wad or stiff mud. The extruded mass may be pressed into a die or formed in a forming machine, a jigger lathe or other apparatus to produce articles as above described.

The present application differs from co-pending applications No. 87,824 and No. 87,825 (now Patent No. 2,310,953) filed June 29, 1936, and No. 131,126 filed March 16, 1937, by utilizing a purified aluminous material devoid of the usual impurities of bauxite, diaspore and gibbsite, and yet derived at low expense from these mineral aluminous materials.

It is to be understood that the processes described in the present application are also applicable to mixtures of aluminum oxides with other ceramic oxides, and also to other ceramic oxides such as magnesium oxide.

The finely divided aluminous material produced according to the present invention might be readily used as a bonding agent in connection with other ceramics, such as those composed of silicates, magnesium oxide, and so forth, or the granular oxide may be utilized as a filler in making other ceramic materials.

It is apparent that many changes could be effected in the process and procedures above described, and in the specific details thereof without substantially departing from the invention intended to be defined in the claims, the specific description herein merely serving to illustrate certain compositions by which, in one embodiment, the spirit of the invention may be effectuated.

What I claim is:

1. A process of making vitreous-like aluminous ceramics which comprises dehydrating at a low red heat to retain the colloidal properties and then wet grinding a chemically purified alumina in the presence of water until it has been partly hydrated and until the particles thereof have a size less than 20 microns and ranging between about 12 and 20 mircons for the unhydrated ground material and below about 12 microns for the ground hydrated material, removing the water, forming and firing.

2. A process of making vitreous-like aluminous ceramics which comprises dehydrating at a low red heat to retain the colloidal properties and then wet grinding a chemically purified alumina in the presence of water until it has been partly hydrated and until the particles thereof have a size less than 20 microns and ranging between about 12 and 20 microns for the unhydrated ground material and below about 12 microns for the ground hydrated material, removing the water, forming and firing at a temperature of about 1000° C. to 1500° C.

3. A dense, vitreous, non-porous, aluminous ceramic consisting of a purified, dehydrated, calcined bauxite, having a particle size less than about 20 microns which has been fired to a temperature of 1000° C. to 1500° C.

4. A dense, vitreous, non-porous, aluminous ceramic consisting of a purified, dehydrated, calcined diaspore, having a particle size less than about 20 microns, which has been fired to a temperature of 1000° C. to 1500° C.

5. A dense, vitreous, non-porous, aluminous ceramic consisting of a purified, dehydrated, calcined gibbsite, having a particle size less than about 20 microns, which has been fired to a temperature of 1000° C. to 1500° C.

6. A process of making vitreous-like aluminous ceramics which comprises dehydrating at a low red heat to retain the colloidal properties and then wet grinding a chemically purified alumina derived from bauxite to a particle size substantially less than 20 microns in the presence of water and a flux until it has been partly hydrated, filtering to remove the water, drying and powdering the filter cake, forming and firing at 1400° C. to 1500° C.

7. A process of making vitreous-like aluminous ceramics which comprises dehydrating at a low red heat to retain the colloidal properties and then wet grinding a chemically purified bauxite, which has been purified by dissolving it in caustic soda and precipitating to a particle size substantially less than 20 microns, removing the water by filtration, drying, powdering, forming and firing at a temperature of about 1000° C. to 1500° C.

JOHN ALLEN HEANY.